Jan. 11, 1966 M. E. HOMAN ETAL 3,229,251

COMPUTER ERROR STOP SYSTEM

Filed March 26, 1962 5 Sheets-Sheet 1

FIG. 1 COMPUTER ERROR STOP SYSTEM

INVENTORS
MERLE E. HOMAN
ROBERT M. MEADE

BY Melvin P. Williams

ATTORNEY

Jan. 11, 1966 M. E. HOMAN ETAL 3,229,251

COMPUTER ERROR STOP SYSTEM

Filed March 26, 1962 5 Sheets-Sheet 2

Jan. 11, 1966 M. E. HOMAN ETAL 3,229,251

COMPUTER ERROR STOP SYSTEM

Filed March 26, 1962 5 Sheets-Sheet 4

COMPUTER ERROR STOP SYSTEM TIMING

COMPUTER ERROR STOP SYSTEM OVERRIDE

United States Patent Office 3,229,251
Patented Jan. 11, 1966

3,229,251
COMPUTER ERROR STOP SYSTEM

Merle E. Homan, Poughkeepsie, and Robert M. Meade, Wassaic, N.Y., assignors to International Business Machines Corporation, New York, N.Y., a corporation of New York Filed Mar. 26, 1962, Ser. No. 182,257
12 Claims. (Cl. 340—146.1)

This invention relates to circuitry for stopping a computer in response to the generation of errors therein, and more particularly to an improved high speed computer error stop system.

In the computer art, it has long been known that practical utility of computing and data processing machines requires that the results of computations and/or calculations must be accurate. Furthermore, propagation of information within the machine, translating from one code into another, manifesting results, and sensing or recording information within input/output devices must all be done accurately. Therefore, the better computing machines are provided with a great number of error checking circuits, the results of an error being used to stop the machine from further computations or merely to register the fact of an error in a storage position or at an indicating panel, or both. Furthermore, when an error occurs in one part of a computer, a signal indicating this fact must be propagated to other parts of a computer. Heretofore, computing speeds have been fairly slow with respect to the speed of light, and therefore propagation of signals has not required any apperciable part of computer operating cycle time.

As the need for higher speed computing machines developed, the length of computing machine cycle time has become reduced considerably. This results in a smaller amount of time being available in which to check the results of computations, and in fact, has reduced computing machine cycle time to a point where the time it takes to propagate electric signals is no longer insignificant with respect to computer cycle time. For instance, at least one computer has been developed in which the circuits operate in tens of nanoseconds. (A nanosecond is $10^{-9}$ seconds, or one millimicrosecond.) In one nanosecond, the fastest conductor-carried electric signal will travel approximately one foot. In a large, modern computing machine comprised of many units, it is conceivable that one part of the machine may be located 30 or 50 feet distant from other parts of the machine. This of course means that it requires at least 30 or 50 nanoseconds, or perhaps two or three "logic-times," for a signal to propagate from one extreme unit to another extreme unit.

Additionally, the sheer magnitude and complexity of modern computing machines means that there is a greater chance for an error to occur within a single machine, and the particular fault which caused the error may be any one of the tremendous number of possible faults which may possibly occur. It is therefore obvious that trouble-shooting procedures, sometimes known as diagnostic procedures, must be of the finest possible type in order to maintain large computing machinery in a proper operation condition. In order to assist in diagnostic or trouble-shooting procedures, it is necessary to known something about the faults which have occurred. Prior art error checking and machine stopping systems have permitted erroneous data to be acted upon, thereby scrambling the result which is obtained during an operation wherein errors have occurred, and changing the status of error indicators. This has meant that the actual data and the error indications obtained from the machine have not been diagnostically informative in assisting the determination of the portion of the data which is incorrect, and ultimately, the particular part of the machine within which the error-causing fault has occurred.

It is therefore a primary object of this invention to provide a high speed computer error stop system.

Another object is to provide faster shutdown of a computing machine in response to errors in any one of the units which comprises the machine.

One of the foremost diagnostic aids known to the art is the "scanning" of certain key parts of a computer, together with the recording of information sensed during scanning. It is useful not only to scan the condition of important error indicators, but also to scan key data registers as well. Thus, a record is made of the data content of registers as well as the identity of circuits (or groups of circuits) in which a fault has occurred. However, it sometimes happens that a fault is tranient in nature, such as will occur from noise signals, or from a true error in a circuit capable of correcting the error. In such cases it is necessary to preserve an indication of the location of the fault, as well as the data which resulted from an error.

Another object is to provide a computing machine error stop system compatible with improved diagnostic procedures.

Other objects of the invention include provision of a high speed computer error stop system capable of preserving the effect of transient errors long enough to stop the machine and record the fault indications and/or data conditions resulting from any machine fault; provision of a high speed computer error stop system capable of preserving data resulting from operations within which an error occurs; and provision of a high speed computer error stop system capable of preserving fault-localizing indications of transient errors until a diagnostic recording thereof can be made.

Since many errors in a computing machine may be of a non-transitory, or static nature, it is concenvable that an error stop could prevent further computer operation until a fault had been determined and corrected. A computer may include circuits of the type which can correct erroneous data automatically. However, if the computer is stopped, error correction may be impossible. Thus, static, or quasi-static errors may cause a computer to freeze in an error stop condition.

Further objects of the invention include:

Provision of an improved computer error stop system capable of overcoming the stopped condition which results from static errors or quasi-static errors;

Provision of a high speed computing machine error stop system compatible with self-correction of stop-causing errors during a period of error-stop, so as to facilitate the resumption of operations under error-free conditions;

Provision of an improved high speed computing machine capable of stopping error-related operations of the machine, and thereafter permitting said operations to resume even though the error persists.

Whenever a computer is run in a special condition which ignores the fact that an error has caused the machine to stop, the machine is insensitive to further errors in at least a part of the machine. Therefore, operating the machine under an "override" may permit erroneous data to be generated but not detected.

Another object is to provide a computer error stop system including means to overcome an error stop condition with automatic return to normal operation after an error is removed.

Many computer circuit faults can be eliminated only by extensive trouble shooting including circuit operation analysis. This may include operating the machine for one cycle at a time while the performance thereof is observed, as is well known in the art. Due to the greater size of modern computing machinery, it has been found to be desirable to check the machinery under conditions as near to the actual operating conditions as possible.

Still other objects of the invention include:

Provision of a high speed computing machine error stop system wherein the stopping and resumption of the functions of the machine in response to sensed errors are accomplished so as to stop and resume machine functional operations under conditions most nearly like normal machine operating conditions;

Provision of such a system wherein the computer may be purposefully stopped and resumed or run for only a single cycle or several cycles, with the starting and stopping being in a fashion which is as near to normal computer operations as possible.

The main functional relationship of this invention is predicated on the concept that electrical signals take time to travel from one unit to another over signal transmission lines, and that therefore more of the signals traveling from a first unit to a second unit will be cut off (e.g., the earliest signal of a train of signals will be stopped) if they are blocked at said second unit rather than at the output from said first unit.

In accordance with the present invention, each unit of a computer has its own error checking circuitry, which will cause the fact of an error in that unit to be immediately transmitted directly to all other units of the system. Therefore, transmitting of the error to a main control unit of the system for subsequent distribution to each of the units of the system is eliminated. Furthermore, even the main unit itself, which differs from other units only slightly, is directly responsive to the error transmitters in each of the other units, and has program and other checking circuits to indicate errors in the control of the computer. Errors occurring in the main computing unit are likewise transmitted directly to each other unit of the machine so that the entire machine is shut down simultaneously, after a very slight delay, as a result of any error in any part of the computing system.

In further accord with the present invention, the main timing or clocking signals which keep the various units of the system operating in synchronism are blocked at the point of their use in the individual units, rather than at the source, thereby decreasing the time necessary for the functions of all units to be terminated as a result of an error. Additionally, override means are provided to permit one or more of the units to resume operations notwithstanding the occurrence of an error-stop condition, and the effect of override is removed and error-sensitive operation is resumed, when the error disappears. Also, means are provided whereby indications of the circuit at fault may be preserved. Further, a computer may be operated for one or more separate cycles by means of the error stop system of this invention.

The features of this invention include the fact that the entire computing system can be shut down within a cycle following the one in which an error is generated, before erroneous data can be further acted upon. This preserves the data for examination to assist diagnostic personnel in determining the exact nature of the error, and therefore the fault which caused the error. Also, since an indication of the faulty circuit is preserved, transient errors can be traced to the point of origin thereof in the computer. Furthermore, since errors may be overridden by the overriding signal means, static errors will not freeze the machine in an error stop state, and errors can be purposefully introduced into the system, and override signals provided to let the system run for one, two or more cycles without requiring the stopping of the main timing or clocking signals of the system, thereby permitting single or multiple cycle operations of the computing system under nearly-normal operating conditions. Additionally, use of the overriding signal permits resumption of computer operations, without completely eliminating the indication of the fact that an error has occurred. In fact, override can be removed and the computer will again stop due to the same error which stopped it previously. This permits the distinction between "raw error" and overridden error. Since the main synchronizing signals continue even though blocked at certain units of the computer, housekeeping functions (such as certain forms of error correction) can continue while the computer is in an error stop condition. Also, since override (used to resume operations) may prevent stopping from subsequent errors, the raw error means may remove override as soon as the error is cleared up, thus automatically rendering the machine subject to error-caused stops as soon as possible.

The foregoing and other objects, features and advantages of the invention will be apparent from the following more particular description of preferred embodiments thereof as illustrated in the accompanying drawings.

BLOCK DESCRIPTION (FIG. 1)

Figure 1:
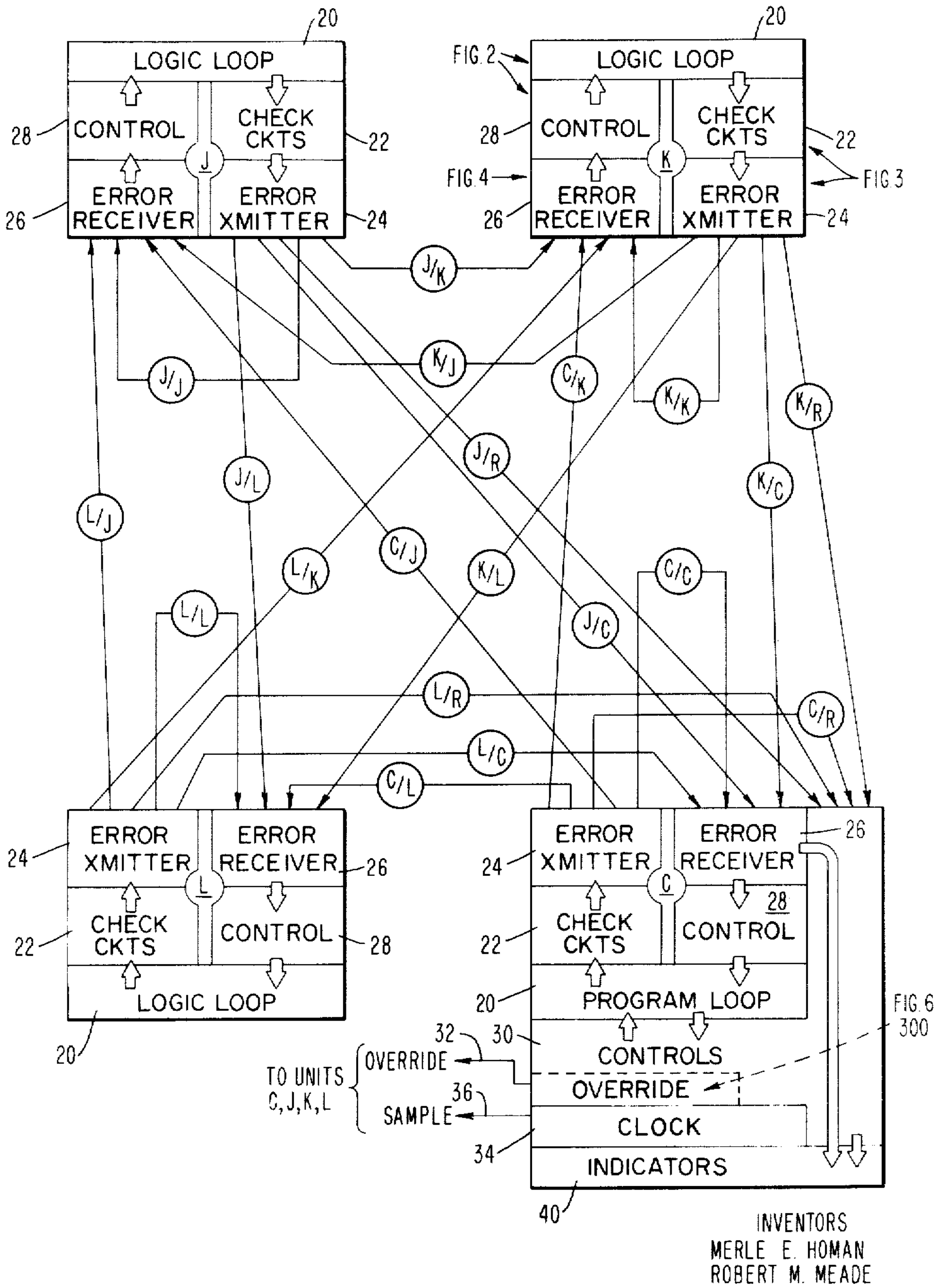
FIG. 1 is a schematic block diagram of one illustrative embodiment of a computing system in accordance with the present invention.

FIG. 1 shows, in schematic block diagram form, one illustrative embodiment of a computing system in accordance with the present invention. Such a system may include a number of units such as the units C, J, K and L. Each of the units C, J, K and L may comprise completely autonomous logic performing units which, however, are cooperating in a synchronized fashion so as to form a computing machine. However, one unit (unit C, in FIG. 1) must supply the synchronization to all of the units, including itself, and must provide certain functions and controls which will be described more fully hereinafter. On the other hand, the unit C could comprise a central processing unit, as is well known in the prior art, in which case the units J, K and L would be any well-known form of peripheral or input/output device normally associated with a central processing unit so as to form a computing machine. Which type of computing machine is involved is immaterial to the invention, but it should be emphasized that this invention renders it unnecessary to have a central control for error checking and error stopping purposes, even though the computing machine must be shut down in its entirety, completely simultaneously.

Each of the units in FIG. 1 (including unit C) have some sort of a LOOP 20 wherein intelligent operations occur. In units J, K and L, this is indicated as a LOGIC LOOP 20; in unit C, this is called a PROGRAM LOOP 20, merely for illustration purposes. However, any one of the logic loops or the program loops could be a between-units transmission facility; that is to say, a plurality of transmission lines together with gates and amplifiers utilized to transmit data from one unit to another may readily be checked by any well-known checking means (particularly by such self-checking codes as the well-known Hamming code), and if transmission of data is faulty, error stop may be instituted by error stop means (of the type shown in the units of FIG. 1) associated with the transmission facility itself. Similarly, transmission of data over such transmission facilities may be stopped directly just as operations by units may be stopped directly, regardless where an error occurs in the system. Further, although all of the units of FIG. 1 are shown to be controlling, and controlled by, all other units, it should be readily understood that this is not necessary in a given application of this invention. For instance, the C/K could be removed if it is desired to have the K unit independent of errors in the C unit. The specific system shown in FIG. 1 has been chosen merely for its simplicity as an aid in understanding the concept of the invention.

Each of the units has a CHECK CIRCUIT 22, associated with the LOGIC or PROGRAM LOOP 20, which checks the computation results or program indications and performs parity checks, etc. If an error is determined, this is transmitted to an ERROR TRANSMITTER 24 of the corresponding unit. The ERROR TRANSMITTER 24 then propagates the fact of an error to all of the other units as well as to the unit in which the ERROR TRANSMITTER is located. Each of the units is provided with an ERROR RECEIVER 26 for receiving signals from any other ERROR TRANSMITTER 24 or from its related ERROR TRANSMITTER 24. For instance, if there is a K unit error, the K unit ERROR TRANSMITTER 24 will send a signal to the K unit ERROR RECEIVER 26 as indicated by the line K/K (which means K unit stops K unit). The K unit will also transmit this information to stop the J unit as indicated by the line K/J (which means K unit stops J unit), etc. Conversely, the K unit ERROR RECEIVER is responsive to the ERROR TRANSMITTER in each other unit as well as to that in unit K. For instance, the L unit will transmit error stop information over the L/K line (which indicates L unit stops K unit). Each unit also sends what is called a raw error to a main unit (herein called unit C). The difference between raw error and error stop indications is that the stop indications can be removed by an OVERRIDE signal (introduced hereinafter), whereas raw error remains for as long as the error condition exists. This is useful in permitting OVERRIDE to be removed as soon as the error disappears, which returns the error stop system to full useful capacity quickly whenever transient errors occur. As an example, in the extreme righthand side of FIG. 1, the K unit sends raw error information to a CONTROLS section 30 (here shown in the C unit) over the K/R line (K/R merely indicates K unit raw error).

Each of the units C, J, K and L also have a CONTROL section 28 which includes all of the normal controls for the logic loop as well as incorporating circuits responsive to the stop information propagated to it by the corresponding ERROR RECEIVER 26. It is within the CONTROL section 28 that the units are stopped from performing further operations as a result of error stop information. The unit C is shown as including the CONTROLS section 30 including an OVERRIDE device 300 which supplies an OVERRIDE signal on a line 32, and a CLOCK section 34 which supplies a SAMPLE signal on a line 36. The SAMPLE signal on line 36 is what causes the individual units of the computing system to operate in synchronism with one another. The SAMPLE signal on line 36 is prevented from activating the respective LOGIC LOOPS or PROGRAM LOOPS 20 by means included in the corresponding CONTROL section 28 of each of the units C, J, K and L. From this, it can be understood that signals traveling from the CLOCK section 34 of the C unit cannot be stopped at the C unit once they have left it, but they can be stopped within the individual CONTROL section 28 of each of the individual units, so that the effects of SAMPLE signals will not be felt in the LOGIC or PROGRAM LOOPS 20. This is a main feature of the invention.

Also included in the C unit (in the instant exemplary case) are INDICATORS 40 which indicate units within which the individual errors occur.

LOGIC LOOP AND CONTROL (FIG. 2)

Figure 2:
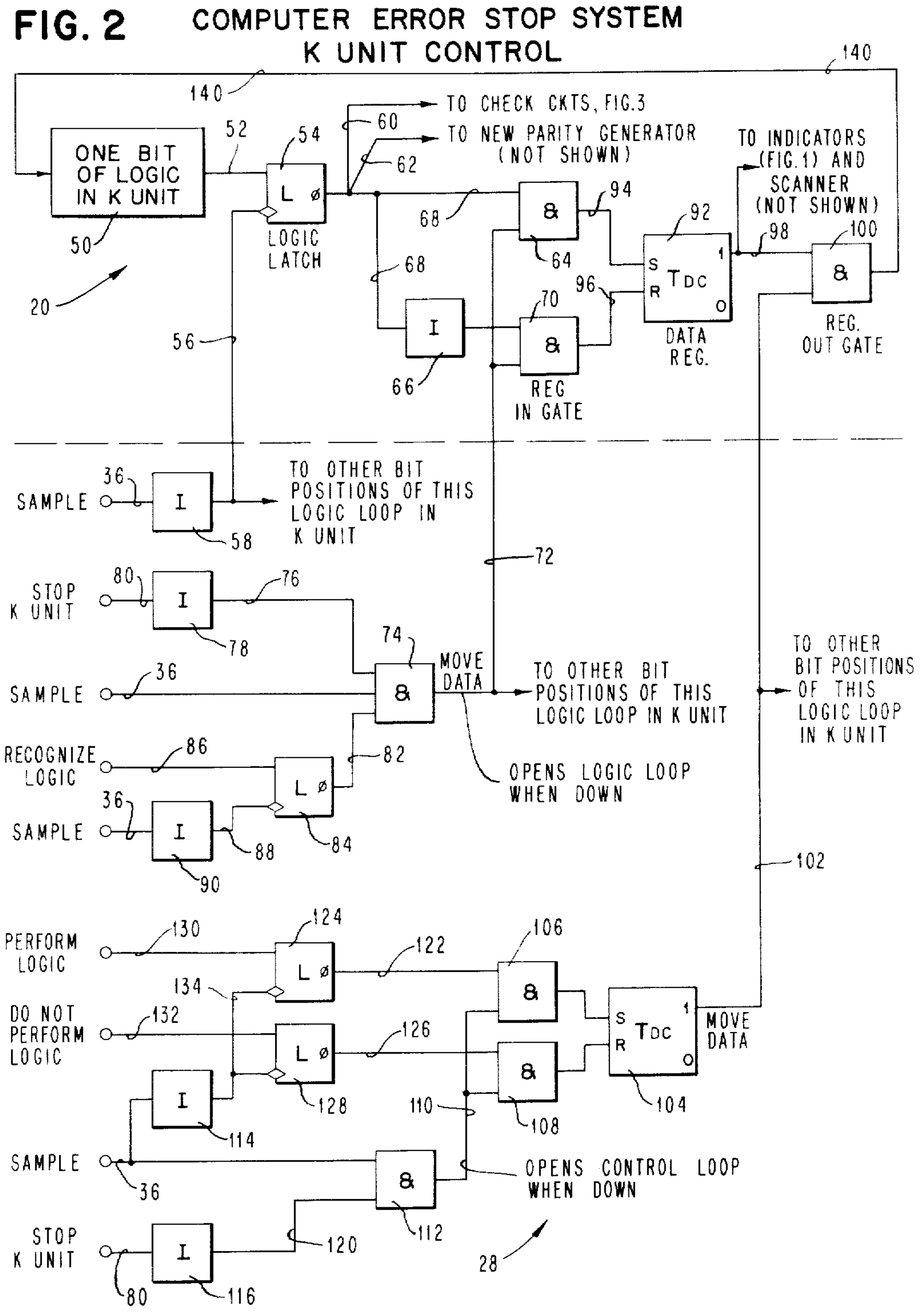
FIG. 2 is a schematic block diagram of an illustrative embodiment of a computer error stop system control unit and a logic loop of the computing system embodiment shown in FIG. 1 which is controlled thereby.

The LOGIC LOOP 20, and the CONTROL section 28 associated therewith, in each of the units are identical with those in each other unit insofar as error stopping is concerned; these are shown in FIG. 2. Referring briefly to the stop of FIG. 2, one bit of a LOGIC LOOP 20 in the K unit is shown. It should be noted that each of the units J, K, L and C can have more than one loop, and each of these loops may be separately controlled, although the control of each loop is dependent upon the same error stop lines. Further, each loop will usually comprise many bit positions, only one of which is represented in FIG. 2. Logic is performed by one bit of logic 50, the results of which are transmitted over a line 52 to a LOGIC LATCH 54. The LOGIC LATCH 54 will respond to the signals on line 52 whenever a signal is present on a latch line 56, which is the output of an inverter 58 fed by the SAMPLE line 36. The in-phase output ($\phi$) of the LOGIC LATCH 54 is transmitted over a line 60 to the CHECK CIRCUITS 22 (shown in FIG. 3 and described hereinafter), and over a line 62 to means (not shown) which generate a new parity bit to correspond to the new information as a result of the logic performed. The output of the LOGIC LATCH 54 is also transmitted to an AND circuit 64 and an inverter 66 via line 68. The output of the inverter 66 is connected to an AND circuit 70, which together with the AND circuit 64 comprises a REGISTER IN GATE circuit.

The AND circuits 64, 70 are also controlled by a MOVE DATA line 72 which comprises the output of an AND circuit 74. The AND circuit 74 will respond to a SAMPLE signal on a line 36 at sample time, provided there is a signal on a line 76 from an inverter 78 resulting from the absence of a STOP K UNIT indication on a line 80. The AND circuit 74 is also gated by the in-phase output 82 of a logic control latch 84 which can be turned on whenever the result of logic performed in this loop is to be utilized, as a result of a RECOGNIZE LOGIC signal on a line 86. However, the latch is prevented from being turned ON or OFF during sample time by a latch signal on a line 88, which comprises the output of an inverter 90 in response to a SAMPLE signal on the line 36. Thus, information stored in the LOGIC LATCH 54 may be gated through the REGISTER IN GATE 64, 70 any sample time after the latch 84 has been turned ON, provided there is no STOP K UNIT signal on the line 80. The REGISTER IN GATE 64, 70 feeds a DATA REGISTER, which comprises a D.C. trigger 92 having a set line 94 energized by the AND circuit 64 and a reset line 96 energized by the AND circuit 70. Thus, when there is a MOVE DATA signal on the line 72, if there is a signal out of the LOGIC LATCH 54 (indicating a binary ONE), the AND circuit 64 will cause the trigger 92 to become (or to remain) set, or ON, but if there is no output from the LOGIC LATCH 54 (indicating a binary zero), then the AND circuit 70 will cause the trigger 92 to become (or to remain) reset, or OFF. The "1" or ON side of the trigger 92 is connected by a line 98 to a REGISTER OUT GATE which comprises an AND circuit 100, and is also connected to INDICATORS 40 (FIG. 1) and to scanning circuitry (not shown).

The AND circuit 100 is gated by a MOVE DATA signal on a line 102 which comprises the "1" or ON output of a trigger 104. The trigger 104 may be set or turned ON by an AND circuit 106 and may be reset or turned OFF by an AND circuit 108. The AND circuits 106, 108 are gated by a signal on a line 110 from an AND circuit 112. In order for there to be a signal output from the AND circuit 112, there must be a SAMPLE signal supplied by the line 36, and there must be be no STOP K UNIT signal on the line 80 to an inverter 116. Under such circumstances, there will be a signal on a line 120 from the inverter 116, causing the AND circuit 112 to gate both of the AND circuits 106, 108. The AND circuit 106 passes a signal on a line 122 from a "perform-logic" latch 124 and the AND circuit 108 passes a signal on a line 126 from a "do-not-perform-logic" latch 128. The latch 124 may be turned ON by a PERFORM LOGIC signal on a line 130 and the latch 128 may be turned ON by a DO NOT PERFORM LOGIC signal on a line 132, provided that there is a latch signal on a line 134 from an inverter 114. Thus, either of the latches 124 or 128, or both, for that matter, may be turned ON or turned OFF, in dependence upon signals on the lines 130, 132, at any time except during sample time.

Data which is generated as a result of logic performed in the LOGIC block 50 is therefore stored in a DATA REGISTER comprising trigger 92, and when a MOVE DATA signal appears on line 102, this data is then taken out of the DATA REGISTER by the REGISTER OUT GATE 100 and transferred back to the input of the LOGIC block 50 over a line 140. Thereafter, new information will be derived, as a result of logic, which will be transferred through the LOGIC LATCH 54 and through the REGISTER IN GATE 64, 70 back to the DATA REGISTER 92.

Figure 5:
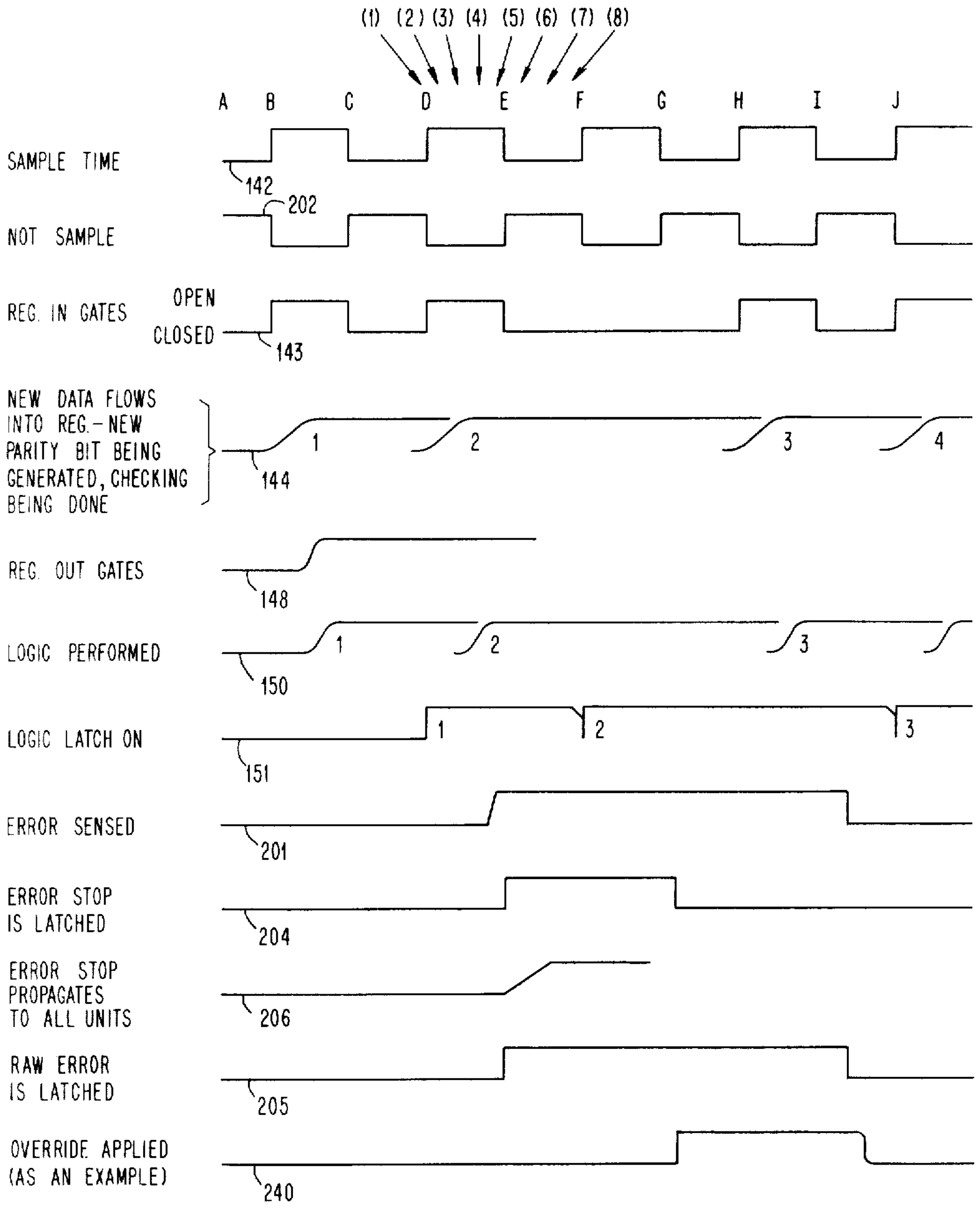
FIG. 5 is a chart illustrating the timing of the computing system embodiment shown in FIGS. 1–4.

Referring now to a timing chart shown in FIG. 5, at the beginning of sample time (waveform 142), which is B-time in FIG. 5, the REGISTER IN GATE 64, 70 is opened (as indicated by waveform 143), and data begins to flow from the LOGIC LATCH 54 into the DATA REGISTER trigger 92. In a typical machine, the data will be stored in the DATA REGISTER 92 after about one-third of the SAMPLE signal has elapsed, as indicated by the waveform 144. Assuming that the REGISTER OUT GATE had been previously closed, and that the latch 124 now has an output indicating that logic is to be performed, then a SAMPLE signal on line 36 will pass through the AND circuit 112 so as to permit the output of the latch 124 to be gated through the AND circuit 106 turning the trigger 104 ON. In an actual circuit which might require several stages of transistor logic to operate before the trigger 104 would be ON, the output 102 from the trigger 104 would appear at about the middle of sample time as shown by the waveform 148. Thus, just after the middle of sample time, data will flow through the REGISTER OUT GATE 100 over the logic loop line 140 and into the logic performing circuit 50. Therefore, logic would actually begin to be performed late in the sample time, as illustrated by the waveform 150. This logic is made available on line 52 as an input to the LOGIC LATCH 54, and since the latch line 56 causes the latch to be blocked only during sample time (positive portion of waveform 142, which includes B-time to C-time in FIG. 5), the new logic on line 52 conditions the latch between C-time and D-time, and the logic is locked into the latch only at the start of the following sample time (i.e., at D-time), as shown by waveform 151. At this same time, the REGISTER IN GATES are again opened, and therefore, the new data can begin to flow into the DATA REGISTER shortly after the start of sample time. Due to circuit delays, the data may not have the trigger fully set until about twenty percent of sample time has elapsed, as shown by the waveform 144.

Hereinbefore, the RECOGNIZE LOGIC signal on line 86 was introduced. This represents a signal normally used in a computing machine as a control over the logic itself. In an actual machine, this signal might have any name, and may represent any one of many conditions. However, insofar as purposes of this invention are concerned, it suffices that there is a signal which when present causes the DATA REGISTER 92 to respond to the output of a LOGIC unit 50, provided all other conditions are met. Similarly, the latches 124 and 128 are shown to respond to signals on line 130 and 132 which will cause logic to be performed, or which will cause logic to not be performed. These signals are representative of control signals in a computing machine which would control the movement of data from a data register into a logic performing unit. Again, in an actual computing machine, the signals might be identified with varying nomenclature, and may represent any one of many different conditions. It is to be noted, however, that the PERFORM LOGIC signal on line 130 is not the complement, or inverted argument, of the DO NOT PERFORM logic signal on line 132. Either of these signals may be absent without the presence of the other. However, due to the trigger 104, and the fact that the output thereof is the gating signal on line 102 which enables data to pass through the REGISTER OUT GATE AND circuit 100, the condition of either performing or not performing logic, alternatively, is actually present in the logic loop at all times.

ERROR TRANSMITTER (FIG. 3)

Figure 3:
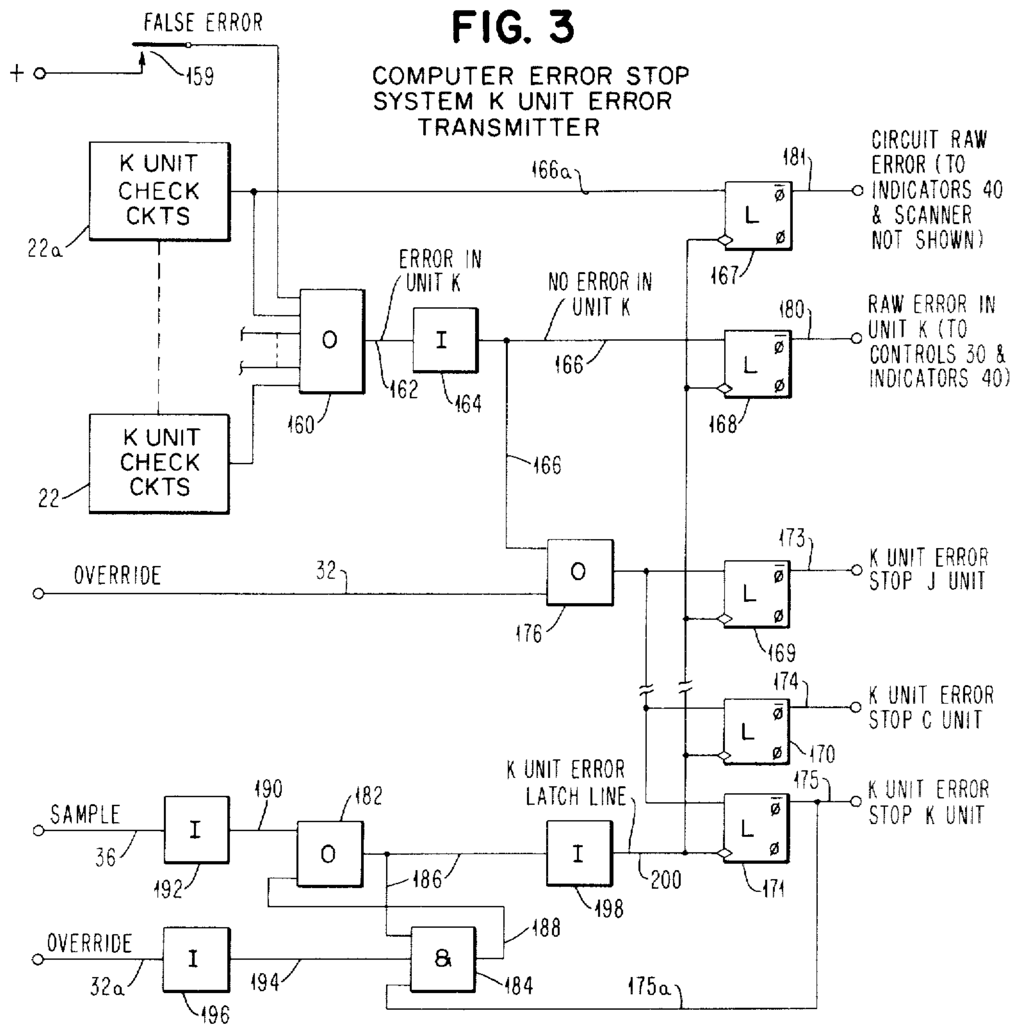
FIG. 3 is a schematic block diagram of an illustrative embodiment of a computer error stop system error transmitter unit for use in the computing system embodiment shown in FIG. 1.

An error transmitter 24 is shown in schematic block diagram form in FIG. 3. The nomenclature in FIG. 3 has been selected to represent the circuitry in the K unit. However, this is for purposes of illustration only, and it should be understood that this circuit represents a typical circuit which could be the same error transmitter 24 found in each of the units C, J and L as well. At the top of FIG. 3, K unit CHECK CIRCUITS 22 are shown, all feeding an OR circuit 160, the output of which on a line 162 designates ERROR IN UNIT K. It is to be noted that the K unit CHECK CIRCUITS 22 check all of the different logic loops which may exist in unit K. There is also provided a FALSE ERROR switch 159, which, when closed, provides an indication equal to an error indication from one of the CHECK CIRCUITS 22. The purpose of this switch is disclosed hereinafter. The output of the OR circuit 160 is inverted by an inverter 164 so as to form a NO ERROR IN K signal on a line 166, which signal will turn ON all of a plurality of latches 168–171. The output of a selected CHECK CIRCUIT 22*a* will similarly turn ON a corresponding latch 167 via a line 166*a*. A stop latch 169–171 is provided for each unit in the system, including the main control unit (C unit) and the unit in which the error is developed (K unit, in this example); a latch 168 is used to designate unit raw error; and a latch 167 is used to preserve an indication of the circuit within which the error occurred, all as described more fully hereinafter. For instance: Latch 169 generates a K UNIT ERROR STOP J UNIT signal 173; latch 170, a K UNIT ERROR STOP C UNIT signal 174; and latch 171, a K UNIT ERROR STOP K UNIT signal 175. (K UNIT ERROR STOP L UNIT has been omitted for simplicity.)

In diagnostic procedures, it is now well known that the condition of certain circuits such as the circuit raw error latch 167 (FIG. 3) and DATA REGISTER 92 (FIG. 2) can be interrogated after an error condition is recognized. In the embodiment shown, a scan of such circuits can be made by diagnostic equipment (not shown) to record conditions existing at a particular time (for instance, between F-time and H-time of waveform 142) following a time during which a data error was generated (for instance, between D and F of waveform 142). Thus, it is possible to sense the error and take a diagnostic scan of the resultant condition of the DATA REGISTER 92 and the circuit raw error latch 167, then apply the OVERRIDE signal and resume operations.

Another way in which the latches 169–171 can be turned ON is by the application of an OVERRIDE signal on the line 32 which is combined in an OR circuit 176 with the NO ERROR IN K signal on line 166. When the latches are ON, the out-of-phase outputs ($\phi$) are down, therefore indicating no error. If the latches are turned OFF, then the K unit error stop lines 173–175 all become energized.

Note that the OVERRIDE signal 32 is not applied to the uppermost latches 167, 168 which develop the raw error indicating signals on lines 180, 181. These latches will remain OFF even after an OVERRIDE has been instituted, to tell the CONTROLS section of the C unit which of the units J, K or L has the signal error, unless the error disappears. The RAW ERROR IN UNIT K signal will cause the OVERRIDE signal to be removed when the error itself disappears.

The latches 167–171 are controlled so as to change from error to no error, or from no error to error, only selectively. This is accomplished by a form of logical latch circuit, shown in the lower left-hand corner of FIG. 3, which is comprised, essentially, of an OR circuit 182 and an AND circuit 184 interconnected by lines 186, 188 so as to form a latch. The latch is considered ON when there is a signal on the line 186. This may be initiated by a signal on the line 190 from an inverter 192 which signal will appear whenever there is no SAMPLE signal on the line 36. However, in order for the ON condition to become latched, it is necessary that the output of the OR circuit on line 186 passes through the AND circuit 184 to the line 188 thereby ensuring that the output of the OR circuit 182 will be maintained even during sample time (when the signal on line 190 disappears). Another input to the AND circuit on a line 194 comprises the output of an inverter 196, which output will be present whenever there is no OVERRIDE signal on a line 32*a*. The third input to the AND circuit 184 is the K UNIT ERROR STOP K UNIT signal on line 175*a*. Thus, the logical latch 182, 184 can become latched ON only when there is a K unit error stop signal on line 175, and there is no OVERRIDE signal, during not-sample time. When the latch 182, 184 is ON, the output thereof on line 186 is inverted by an inverter 198, the output of which comprises a K UNIT ERROR LATCH LINE 200. When there is a signal on the line 200, then the condition of the error stop latches 168–171 can change. When this signal is not present, the condition of the latches will remain as previously set. Interpreting this, when the logical latch 182, 184 is OFF, the condition of the latches 168–171 may change. Thus, the condition of the latches is prevented from changing during not-sample time, and also during sample time if a K UNIT ERROR STOP K UNIT signal appears on line 175 provided that there is no OVERRIDE signal.

OVERRIDE (FIG. 6)

Figure 6:
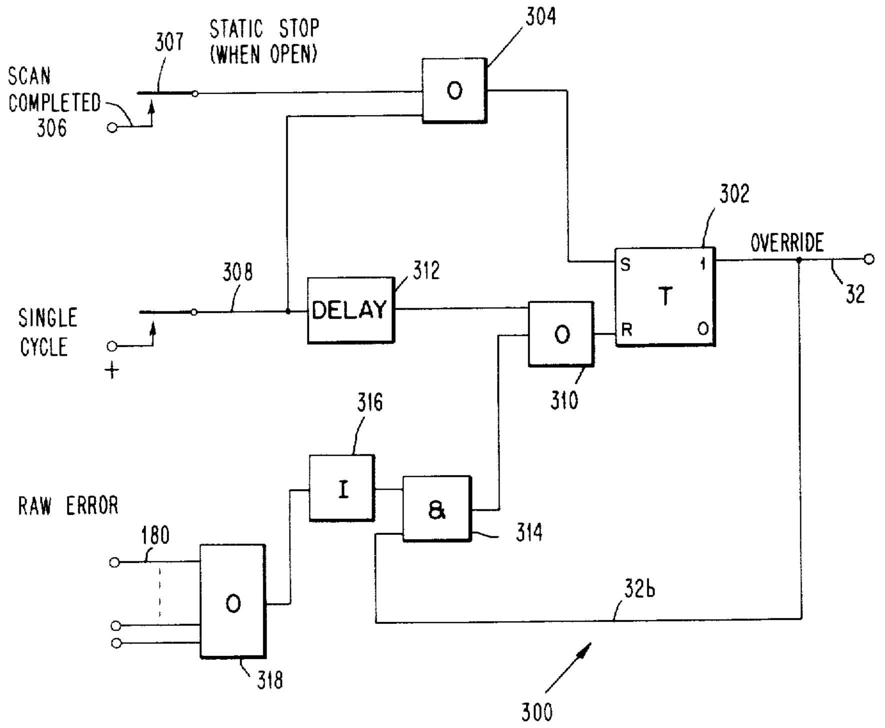
FIG. 6 is a schematic diagram of an illustrative embodiment of an override signal control circuit for use in the system shown in FIGS. 1–4.

The OVERRIDE circuit 300 shown in FIG. 6 comprises essentially a trigger 302. The trigger is set by an OR circuit 304 in response to a SCAN COMPLETED signal on a line 306 or to a steady voltage applied by a SINGLE CYCLE switch 308. The switch 308 is merely illustrative of the ability of an operator to cause single cycle operation; proper circuits to ensure adequate overall operation may be supplied to suit any particular machine design contemplated by those skilled in the art.

The trigger 302 is reset by an OR circuit 310 in response to the output of a delay unit 312 or in response to an AND circuit 314. The delay unit 312 will turn trigger 302 OFF a certain length of time after the single cycle switch 308 has turned the trigger 302 ON. The delay between closing of the switch 308 and an output from the delay unit 312 can be adjusted so as to be a single cycle (as here contemplated) or more cycles. In fact, a plurality of delay units and appropriate switching can be used, so as to provide for selection of a different number of cycles of operation before the resetting of the trigger 302. The AND circuit 314 will provide an output to the OR circuit 310 whenever there is an OVERRIDE signal output from the trigger 302 on line 32*b*, and an output from an inverter 316 which is connected to a RAW ERROR signal line, such as the RAW ERROR IN K UNIT signal on line 180, through an OR circuit 318.

In normal operation, when an error occurs to cause ERROR STOP signals to shut down the logical operations of the computer, diagnostic scanning mechanism (not shown) of any well-known type may be automatically operated to record all of the essential conditions of the computer for purposes of identifying the error which has occurred. When the scan is completed, the scanning mechanism can supply a SCAN COMPLETED signal on line 306 to the OR circuit 304. If a STATIC STOP switch 307 is closed, this will cause the trigger 302 to turn ON generating the OVERRIDE signal on line 32. Thereafter, operation of the computer will resume due to the OVERRIDE signal. The error may thereafter disappear due to the fact that the error was transient in nature, or due to the fact that the error occurred in a circuit having error correction capabilities, or due to the fact that new logical results are derived during OVERRIDE operation. If the error disappears, the RAW ERROR signal (for instance, on line 180) into the OR circuit 318 will disappear. This will cause an output from the inverter 316 to be combined with the OVERRIDE signal on line 32*b* in the AND circuit 314, which will pass through an OR circuit 310 and cause the trigger 302 to turn OFF. In other words, OVERRIDE can be turned ON at the completion of a scan and turned OFF as a result of removal of the error itself. If a static stop mode of operation is desired, the STATIC STOP switch 307 may be opened, thereby preventing override. When operation is to resume, the switch 106 may be closed, and the SCAN COMPLETE signal will operate override as described hereinbefore.

The trigger 302 will provide an OVERRIDE signal on line 32 for a single cycle (or more) if a dummy error is introduced (by switch 159, FIG. 3, as hereinbefore described) and the single cycle switch 308 (or an equivalent multi-cycle switch) were closed, causing the OR circuit 304 to set the trigger 302 ON. Thereafter, the signal supplied by the switch 308 will pass through the delay unit 312 after a certain length of time, and therefore the OR circuit 310 will cause the trigger 302 to be turned OFF after one cycle (or more cycles if a delay unit having longer delay is provided).

ERROR AND OVERRIDE OPERATION (FIGS. 2, 3, 5, 6)

Referring to FIG. 5, an illustrative cycle of logic, within which an error causes a stop, begins at (1)-time, which is the start of sample time as indicated by the waveform 142. At this time, the REGISTER IN GATE (FIG. 2) is opened, allowing new data to flow into the DATA REGISTER 92 at about (2)-time, as shown by waveform 144. At the middle of sample time, (3)-time in FIG. 5, the REGISTER OUT GATE (100, FIG. 2) is opened as indicated by the waveform 148 (shown in FIG. 5 as having remained open since the middle of a prior sample time, between B-time and C-time); data therefore flows into the LOGIC unit 50, and the performance of logic begins. At (4)-time, the CHECK CIR- CUITS 22 (shown in FIG. 3) will indicate the error (assumed here for illustration) which occurred in the preceding cycle, as shown by waveform 201. Therefore, the NO ERROR IN K signal on line 166 disappears, and since the K UNIT LATCH LINE 200 is UP, the error latches 168–171 will all be turned OFF. Thereafter, at (5)-time, the leading edge of not-sample time occurs, as shown by the waveform 202. This prevents the result of logic performed with the prior, error-laden data from being stored in the DATA REGISTER 92 (FIG. 2). The error is then latched since the output of the inverter 190 (FIG. 3) will pass through the OR circuit 182 and after inversion by the inverter 198, it causes the disappearance of the K UNIT ERROR LATCH signal on line 200. Thus, the latches 168–171, which are all presently OFF, are locked in the OFF state by the lack of a signal on line 200. The OFF state of the latches gives rise to all the error signals 173–175 and 180 which stop all of the error-controlled operations (such as the logic loop of FIG. 2) in each of the units of the computer.

If at this time there is no OVERRIDE signal on the line 32*a* (FIG. 3), there will be a signal on the line 194 from the inverter 196, and since the latch 171 has been turned OFF, there will be a signal on the line 175*a*. Thus, the AND circuit 184 provides a signal on the line 188 which passes through the OR circuit 182 onto the line 186 and maintains the AND circuit 184 open. Therefore, the logical latch 182, 184 is latched in the ON condition, which means that there will continue to be no output from the inverter 198 on line 200 so that the condition of the latches 168–171 can no longer change, as shown by waveforms 204, 205.

Throughout this period, that is, from (3)-time through (5)-time, logic continues. However, the error stop signals on lines 173–175 and the raw error signal on line 180 are being transmitted to each of the units at this time, as shown by waveform 206.

ERROR RECEIVER (FIG. 4)

Figure 4:
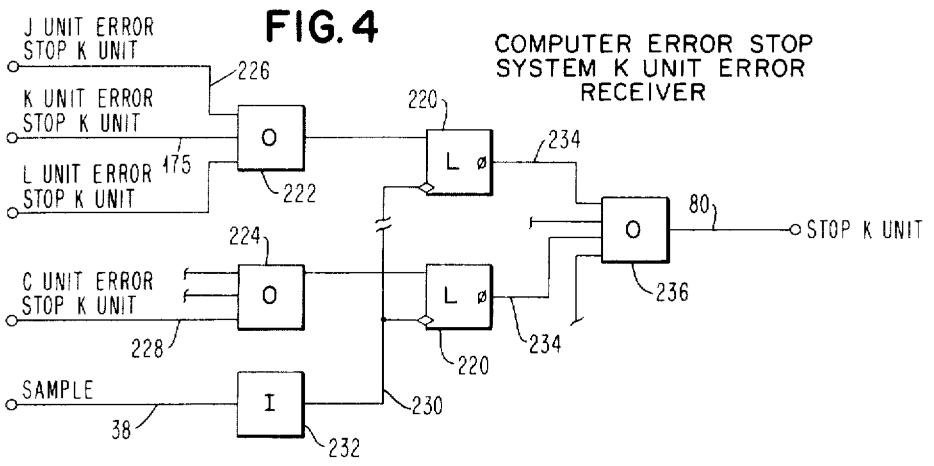
FIG. 4 is a schematic block diagram of an illustrative embodiment of a computer error stop system error receiver for use in the computing system embodiment shown in FIG. 1.

Referring to FIG. 4, a K unit error receiver is shown in schematic block diagram form. The error receiver comprises one or more latches 220, each of which is responsive to at least one OR circuit 224. Each of the OR circuits responds to a plurality of unit error stop signals, such as the K UNIT ERROR STOP K UNIT signal on line 175, the J UNIT ERROR STOP K UNIT signal on a line 226, and the C UNIT ERROR STOP K UNIT signal on a line 228, etc. The latches 220 are controlled by a latch line 230 which comprises the output of an inverter 232 responsive to the SAMPLE signal on line 38. Thus, the latches 220 may respond to the input signals from OR circuits 222, 224 only during not-sample time, as shown in waveform 202 (FIG. 5). The in-phase outputs 234 of the latches 220 are fed to an OR circuit 236, the output of which comprises the STOP K UNIT signal on line 80. Thus, an error stop signal from any one of the units will pass through an OR circuit and, during not-sample time, will cause one of the latches 220 to go on, the resulting output of which is passed through an OR circuit to comprise the STOP K UNIT signal on line 80. A plurality of OR circuits (222, 224) and a plurality of latches (220) are shown merely to illustrate that a great number of ERROR STOP signals may control a single STOP signal (i.e., by OR circuit 236).

Referring to the upper portion of FIG. 2, when the STOP K UNIT signal apears on line 80, the output of the inverter 78 on line 76 disappears, causing the AND circuit 74 to become blocked. This prevents generation of the MOVE DATA signal on line 72, which in turn prevents operation of the REGISTER IN GATE 64, 70. Shown in the lower part of FIG. 2, a STOP K UNIT signal on line 80 will cause the output of inverter 116 on line 120 to disappear, thus blocking the AND circuits 106, 108 which prevents the state of the trigger 104 from changing. Thus, the STOP K UNIT signal on line 80 opens the logic loop on the upper part of FIG. 2 and opens the control circuit to the logic loop in the lower part of FIG. 2; therefore, not only is data prevented from being moved, but the condition of the logic loop is also held in a static fashion.

Referring again to FIG. 5, at (6)-time, the error stop signals are still propagating toward each of the units as shown by waveforms 206. At (7)-time, which is about the middle of not-sample time, the error stop signals reach all of the units and stop them. Due to delay in the circuit components, it is not until (8)-time that the stop signal will actually block the sample signal at the various units. For instance, the STOP K UNIT signal on line 80 will actually be inverted and applied to the AND circuit 74 (top of FIG. 2) at about (8)-time which is roughly eighty percent of the way through not-sample time. Thus, when the next sample time arrives (F-time in FIG. 5), the REGISTER IN GATE will not be opened as shown by waveform 143 and the second generation of erroneous data, that which is generated with the data which gave rise to the error, will be left standing in the LOGIC LATCH 54. This of course means that the output of the LOGIC LATCH 54 on line 60 going to the CHECK CIRCUIT 22 shown at the top of FIG. 3 may continue to indicate an error. Therefore, the NO ERROR IN K signal on line 166 (FIG. 3) will continue to be down, so that the latches 168–171 will remain OFF insofar as actual errors are concerned. However, if an OVERRIDE signal were applied as shown by the waveform 240 (FIG. 5), this would be inverted (bottom of FIG. 3) and applied over line 194 to the AND circuit 184 so as to block the AND circuit 184. Thus the latch 182, 184 will turn OFF, causing the inverter 198 to generate a signal on the K UNIT ERROR LATCH line 200 at sample time so that the condition of the latches 168–171 may again be changed. Also, the OVERRIDE signal on line 32 (middle of FIG. 3) will pass through the OR circuit 176 turning the latches 169–171 ON. This will cause the error stop signals on lines 173–175 to disappear, which eventually will permit operations to resume in each of the units, and will also cause a continual blocking of the AND circuit 184 due to the lack of signals on the line 175*a* and the line 194. In other words, the latch 182, 184 cannot become locked ON except when there is an error. However, since the output of the OR circuit 176 is not applied to the latches 167, 168, the RAW ERROR IN UNIT K signal on line 180 and the CIRCUIT RAW ERROR signal on line 181 will both continue to be generated to indicate to the control section of unit C that the K unit still has an error. Thus, although the error stop signals disappear as indicated by the waveform 204 in FIG. 5, the raw error signal will remain as indicated by the waveform 205, unless the OVERRIDE signal has been applied <u>and</u> the error itself disappears. However, if the actual error in the K unit disappears as a result of performing further logic, or due to error correction means which could be employed (for example, during I-time as indicated by the waveform 201), then the raw error latches can be turned on eliminating the RAW ERROR IN UNIT K signal on line 180 and the CIRCUIT RAW ERROR signal on line 181. When this happens, the lack of a RAW ERROR signal (on line 180, FIG. 6) will cause the override trigger 302 to be turned OFF in response to the inverter 316 and the OVERRIDE signal on line 32*a*. This is shown between I-time and J-time of waveform 240 in FIG. 5.

From the foregoing, it can be seen that the computer error stop system in accordance with the present invention is extremely versatile in terms of the stopping of operations, overriding of the stopping means only when desired, and removal of the overriding condition. Further, transient error indications may be preserved by providing a latch (167, FIG. 3) for any circuit desired. Additionally, any form of single or multiple cycle operation can be employed by suitably controlling the override circuit (FIG. 6). Although in the embodiment shown each unit is capable of stopping every other unit, it should be readily understood that any one error transmitter (FIG. 3) may have stop latches 169–171 for less than all of the other units in the system. As an example, it may be necessary to let the memory continue to read out data to an output device, or to continue to dispose of data into a register or other data reservoir, even if an error has occurred somewhere in the system. Further, it should be readily understood that not all units need to have error transmitters (such as the one shown in FIG. 3). In other words, if certain errors are not related to other current computations, and the error-containing unit is not required to be in synchronism with all other units, then the error need not shut down such other units. Another possibility is providing each unit with an override circuit, instead of using one common circuit, if any particular utilization of the invention so requires.

While the invention has been particularly shown and described with reference to a preferred embodiment thereof, it will be understood by those skilled in the art that the foregoing and other various changes in form and details may be made therein without departing from the spirit and scope of the invention.

What is claimed is:

1. An error stop control apparatus for a computing system of the type having a plurality of units, each of said units including a function performing means, said apparatus comprising:

a plurality of error checking means, at least one for each of said units, each for checking manifestations of data for error and for generating an error signal upon the occurrence of an error;

a plurality of error stop transmitters, one for each of said units, each responsive to error signals from the respectively corresponding error checking means to propagate an error stop signal directly to each of said units whenever the respectively corresponding checking means generates an error signal;

and a plurality of error stop receiving means, one for each of said units, each responsive to error stop signals propagated thereto to stop the operation of the related function performing means.

2. An error stop control apparatus for a computing system of the type having a plurality of units, each of said units including a function performing means, said apparatus comprising:

a plurality of error checking means, at least one for each of said units, each for checking manifestations of data for error and for generating an error signal upon the occurrence of an error;

an override means capable of assuming either a first or a second condition, alternatively, said override means operative when in said first condition to propagate a signal to each of said units, said signal designating the fact that said units are to perform operations notwithstanding the generation of error signals by any of said units;

a plurality of error stop transmitters, one for each of said units, each responsive to signals from said override means and from the respectively corresponding error checking means to propagate an error stop signal directly to each of said units in the absence of a signal from said override means whenever the respectively corresponding checking means generates an error signal;

and a plurality of error stop receiving means, one for each of said units, each responsive to error stop signals propagated thereto to stop the operation of the related function performing means.

3. The device described in claim 2 additionally comprising:

means for generating a false error signal, said error transmitter responding to said false error signal in the same way as it responds to said error signals;

operator-controlled means for setting said override means into said first condition;

and means responsive to said operator-controlled means for switching said override means from said first condition to said second condition a determinable length of time after said override means is set into said first condition by said operator-controlled means.

4. The device described in claim 2 additionally comprising:

a plurality of circuit error means, one each for selected ones of said error checking means, each capable of assuming either one of two states, each responsive to an error signal from the respectively corresponding one of said error checking means to assume a first one of said states in which said circuit error means designates the presence of an error in the respectively corresponding one of said error checking means.

5. An error stop control apparatus for a computing system of the type having a plurality of units, each of said units including a function performing means, one of said units additionally including a general controlling means, said general controlling means generating and transmitting to each of said units a synchronizing signal for causing operations to be performed by each of said units, said apparatus comprising:

a plurality of error checking means, at least one for each of said units, each for checking manifestations of data for error and for generating an error signal upon the occurrence of an error;

a plurality of error stop transmitters, one for each of said units, each responsive to signals from the respectively corresponding error checking means to propagate an error stop signal directly to each of said units whenever the respectively corresponding checking means generates an error signal;

a plurality of error stop receiving means, one for each of said units, each responsive to error stop signals propagated thereto to generate unit stop signals;

and a plurality of control means, one for each of said units, each responsive to said synchronizing signals to cause the related function performing means to operate, each responsive to the respectively corresponding one of said unit stop signals to block said synchronizing signals and to thereby stop the operation of the related function performing means.

6. An error stop control apparatus for a computing system of the type having a plurality of units, each of said units including a function performing means, one of said units additionally including a general controlling means, said general controlling means generating and transmitting to each of said units signals including a synchronizing signal for causing operations to be performed by each of said units, said apparatus comprising:

a plurality of error checking means, at least one for each of said units, each for checking manifestations of data for error and for generating an error signal upon the occurrence of an error;

override means capable of assuming either one of two conditions, alternatively, for propagating an override signal from said general controlling means to each of said units when in a first one of said conditions, said override signal designating the fact that said units are to perform operations notwithstanding the generation of error signals by any of said units;

a plurality of error stop transmitters, one for each of said units, each responsive to said override signal and to signals from the respectively corresponding error checking means to propagate an error stop signal directly to each of said units in the absence of a signal from said override means whenever the respectively corresponding checking means generates an error signal;

a plurality of error stop receiving means, one for each of said units, each responsive to error stop signals propagated thereto to generate a unit stop signal;

and a plurality of control means, one for each of said units, each responsive to said synchronizing signals to cause the related function performing means to operate, each responsive to the respectively corresponding one of said unit stop signals to block said synchronizing signals and to thereby stop the operation of the related function performing means.

7. The device described in claim 6 additionally comprising:

means for generating a false error signal, said error transmitter responding to said false error signal in the same way as it responds to said error signals;

operator-controlled means for setting said override means into said first condition;

and means responsive to said operator-controlled means for switching said override means from said first condition to said second condition a determinable length of time after said override means is set into said first condition by said operator-controlled means.

8. An error stop control apparatus for a computing system of the type having a plurality of units, each of said units including a function performing means, one of said units additionally including a general controlling means, said apparatus comprising:

a plurality of error checking means, at least one for each of said units, each for checking manifestations of data for error and for generating an error signal upon the occurrence of an error;

override means capable of assuming either one of two conditions, alternatively, for propagating an override signal from said general controlling means to each of said units when in a first one of said conditions, said override signal designating the fact that said units are to perform operations notwithstanding the generation of error signals by any one of said units;

a plurality of error stop transmitters, one for each of said units, each including raw error means and error stop means, each of said raw error means capable of assuming either one of two stable states, each raw error means responsive to the corresponding error checking means to assume a first one of said states in which it sends a raw error signal to said general controlling means, said raw error means being switchable from said first state to said second state only in response to the absence of a respectively corresponding one of said error stop signals and the presence of said override signal, concurrently, each of said error stop means responsive to said override signal and to signals from the respectively corresponding error checking means to propagate an error stop signal to each of said units in the absence of a signal from said override means whenever the respectively corresponding checking means generates an error signal;

and a plurality of error stop receiving means, one for each of said units, each responsive to error stop signals propagated thereto to stop the operation of the related function performing means.

9. An error stop control apparatus for a computing system of the type having a plurality of units, each of said units including a function performing means, one of said units additionally including a general controlling means, said apparatus comprising:

a plurality of error checking means, at least one for each of said units, each for checking manifestations of data for error and for generating an error signal upon the occurrence of an error;

override means capable of assuming either one of two conditions, alternatively, for propagating an override signal from said general controlling means to each of said units when in a first one of said conditions, said override signal designating the fact that said units are to perform operations notwithstanding the generation of error signals by any one of said units;

a plurality of error stop transmitters, one for each of said units, each including raw error means and error stop means, each of said raw error means capable of assuming either one of two stable states, each raw error means responsive to the corresponding one of said error checking means to assume a first one of said states in which it sends a raw error signal to said general controlling means, said raw error means capable of assuming the second one of said states in the absence of an error signal from the respectively corresponding error checking means, each of said error stop means responsive to said override signal and to signals from the respectively corresponding error checking means to propagate an error stop signal to each of said units in the absence of a signal from said override means whenever the respectively corresponding checking means generates an error signal;

a plurality of error stop receiving means, one for each of said units, each responsive to error stop signals propagated thereto to stop the operation of the related function performing means;

and means responsive to said raw error means and to said override signal to switch said override means from said first condition to the second one of said conditions in response to the end of said raw error signal.

10. The device described in claim 9 wherein said raw error means is switchable from said first state to said second state only in response to presence of a respectively corresponding one of said error stop signals and the presence of said override signal, concurrently, whereby an indication of error is preserved until said override means assumes said first state.

11. The device described in claim 9 additionally comprising:

means capable of assuming either one of two states, alternatively, each for rendering said override means unresponsive to said raw error means when in a first one of said states.

12. An error stop control apparatus for a computing system of the type having a plurality of units, each of said units including a function performing means, one of said units additionally including a general controlling means, said apparatus comprising:

a plurality of error checking means, at least one for each of said units, each for checking manifestations of data for error and for generating an error signal upon the occurrence of an error;

override means capable of assuming either one of two conditions, said override means operative when in a first one of said conditions to propagate a signal from said general controlling means to each of said units, said signal designating the fact that said units are to perform operations notwithstanding the generation of error signals by any of said units;

a plurality of error stop transmitters, one for each of said units, each including raw error means and error stop means, each of said raw error means responsive to the corresponding one of said error checking means to send an error signal to said general controlling means, each of said error stop means responsive to signals from said override means and from the respectively corresponding error checking means to propagate an error stop signal to each of said units in the absence of a signal from said override means whenever the respectively corresponding checking means generates an error signal;

a plurality of error stop receiving means, one for each of said units, each responsive to error stop signals propagated thereto to stop the operation of the related function performing means;

and a plurality of indicating means in said general controlling means, one for each of said units, each responsive to the respectively corresponding raw error means to indicate that the data within the related unit has an error therein.

References Cited by the Examiner

UNITED STATES PATENTS 2,826,359 3/1958 Deerhake et al. ------ 235—153

2,919,854 1/1960 Singman ----------- 235—153
2,932,005 4/1960 Brightman.
2,959,351 11/1960 Hamilton et al. ----- 235—153
2,981,937 4/1961 Hoberg -------- 340—146.1 X
3,053,449 9/1962 Hoberg et al. ------- 235—157

ROBERT C. BAILEY, *Primary Examiner.*

MALCOLM A. MORRISON, *Examiner.*